Patented Apr. 3, 1923.

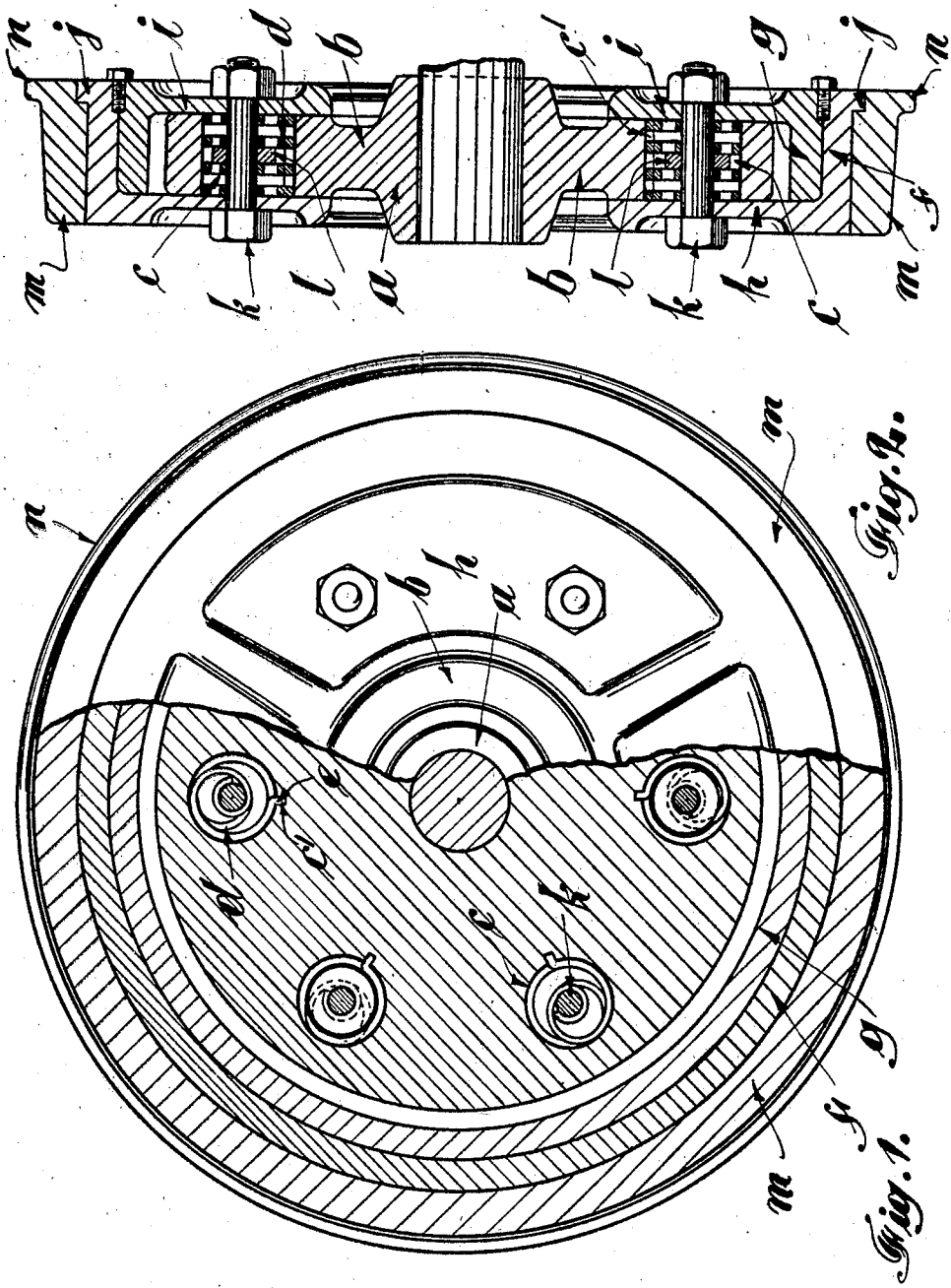

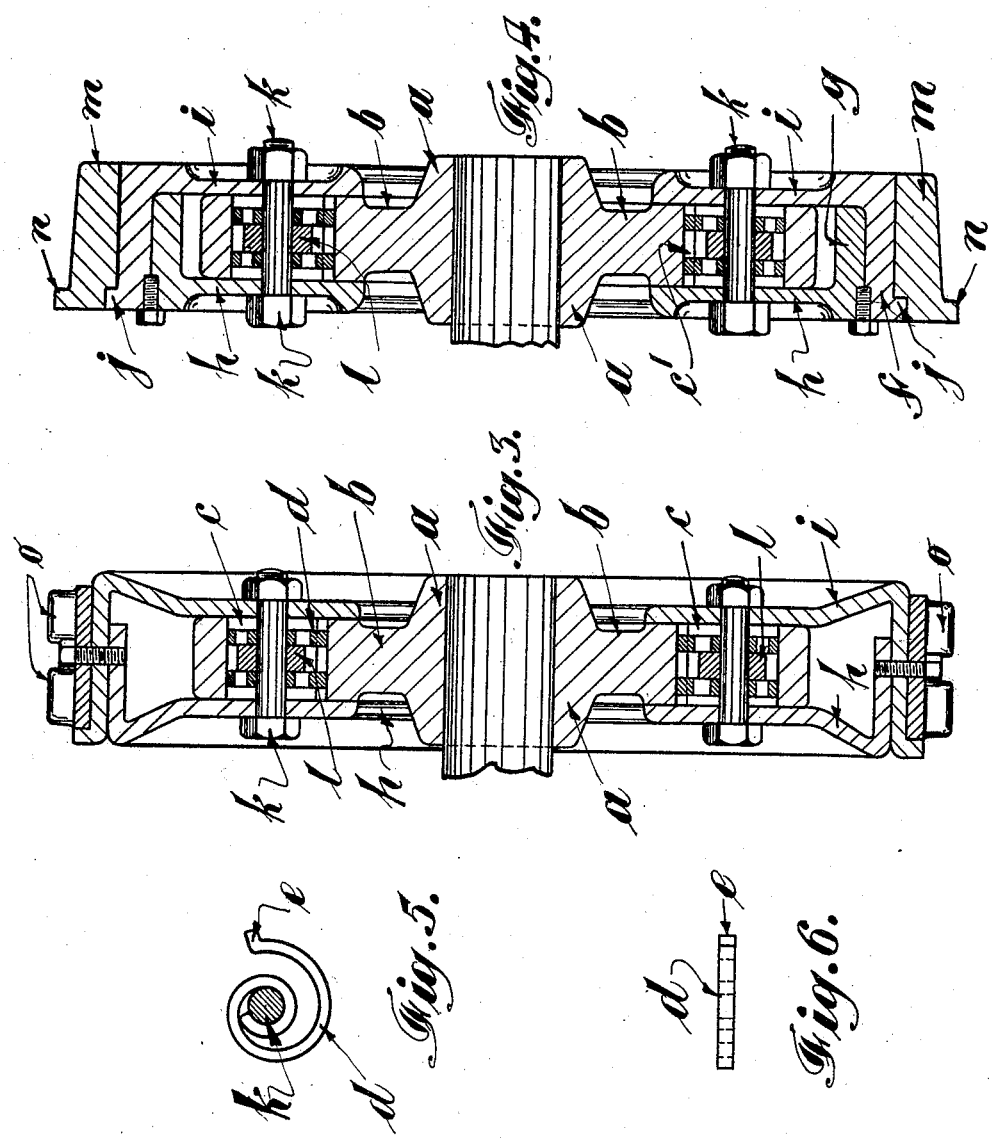

1,450,610

UNITED STATES PATENT OFFICE.

MAX SCHOEKE, OF MANCHESTER, ENGLAND.

VEHICLE WHEEL.

Application filed March 16, 1922. Serial No. 544,285.

*To all whom it may concern:*

Be it known that I, MAX SCHOEKE, a citizen of Carlsruhe, in the Grand Duchy of Baden, Germany, residing at Manchester, England, have invented new and useful Improvements in Vehicle Wheels, of which the following is a specification.

This invention has reference to improvements in the construction of spring wheels for railway trains, tram cars, motor and other vehicles of the kind wherein a hub carrying disc is embraced between side plates carrying the tyre, relative motion between the said disc and the side plates being caused by the load placing a stress on a series of coiled springs contained in transverse openings in the disc.

The present invention has for its object to provide an improved constructional form of such wheel and will be described with reference to the accompanying drawings wherein:

Fig. 1 is a part sectional elevation of a wheel constructed according to invention.

Fig. 2 is a cross-sectional view of Fig. 1.

Figs. 3 and 4 are views corresponding to Fig. 2 showing modified forms of the invention.

Fig. 5 is a detail front view of one of the springs of which, Fig. 6 is an edge view.

Referring to Figs. 1 and 2 the hub $a$ is formed with an all around flange $b$ in which through-holes $c$ are formed to receive springs $d$, see Fig. 5. The springs $d$ are formed with radial projections $e$ to enter slots $c'$ formed in the walls of the through-holes $c$ whereby said springs are retained in the correct operative position in the pockets formed to receive them.

Surrounding the flange $b$ is an annulus comprising two members $f$ and $g$ formed with side flanges $h$ and $i$ respectively. The rim $g$ fits into the rim $f$ which is formed with a flange $j$ around its outer edge and the two members are secured together by through bolts $k$ passing through the holes $c$ and the central coils of the springs $d$. The bolts $k$ are provided with collars or flanges $l$ which are less in diameter than the through holes $c$ to allow of the desired relative movement of the two parts taking place but are of sufficient size to constitute stops to limit the relative movement due to sudden impact or when stopping or starting so as to prevent damage to the springs.

The spiral springs are anchored to the slots $c'$ of which one or more may be formed in each hole $c$ and one or more of such springs may be placed on each side of the collar or flange $l$ and the latter may be free to revolve on its bolt $k$. The springs are preferably arranged alternately in reverse.

The rim $f$ is provided with a steel tread $m$ flanged at $n$ and formed with a groove to receive the flange $j$, the arrangement being such that any sideway thrust on the guard flange $n$ is transmitted through the side flange $h$ to the disc $b$ in a direction tending to force it on to said disc. Instead of the steel tread $m$, a rubber or like tread $o$ may be attached to the rim $f$ as seen in Fig. 4.

By these means a wheel giving efficient springing for the heaviest loads may be obtained, but the drive or sudden jars are received solidly without injury to the springs.

What I claim is:—

1. Spring wheels comprising, in combination, a disc, side flanges overlapping said disc, through holes in said disc formed with circumferential slots, volute springs in said holes having projections to engage said slots, through bolts connecting the side flanges and passing through the holes in the disc and the innermost convolutions of the springs, and collars on said through bolts, relative movement being possible between said disc and flanges, and one of the relatively moving elements being provided with a tyre and the other relatively moving element being provided with a hub, substantially as described.

2. Spring wheels comprising in combination a hub formed with an all around flange in which through holes are formed, said holes being formed with circumferential slots, springs shaped to fit said holes and having projections to enter the slots, a rim comprising two circumferential parts formed with side flanges, the circumferential parts telescopic one inside the other and the outside edge of the outer one being formed with a guard flange, through-bolts to connect the two side flanges together passing through the innermost convolutions of the springs, and collars on said bolts to constitute distance pieces, substantially as described.

3. Spring wheels comprising in combination a hub formed with an all around flange in which through-holes are formed, said holes being formed with circumferential slots, springs shaped to fit said holes and having projections to enter the slots, a rim comprising two circumferential parts formed with side flanges, the circumferential parts telescoping one inside the other and the outside edge of the outer one being formed with a guard flange, a separate tread secured to the flanged rim, through-bolts to connect the two side flanges together passing through the innermost convolutions of the springs, and collars on said bolts to constitute distance pieces, substantially as described.

In testimony whereof I have signed my name to this specification.

MAX SCHOEKE.